(12) United States Patent
Montanari (10) Patent No.: US 12,447,373 B2
(45) Date of Patent: Oct. 21, 2025

(54) WEIGHT DEVICE WITH HANDLE AND MANUFACTURING METHOD THEREOF

(71) Applicant: TRIAL S.R.L., Forli (IT)

(72) Inventor: Giovanni Montanari, Forli (IT)

(73) Assignee: TRIAL S.R.L., Forli (IT)

(*) Notice: Subject to any disclaimer, the term of this patent is extended or adjusted under 35 U.S.C. 154(b) by 130 days.

(21) Appl. No.: 18/571,988

(22) PCT Filed: Jun. 20, 2022

(86) PCT No.: PCT/EP2022/066683
§ 371 (c)(1),
(2) Date: Dec. 19, 2023

(87) PCT Pub. No.: WO2022/268686
PCT Pub. Date: Dec. 29, 2022

(65) Prior Publication Data
US 2024/0285994 A1    Aug. 29, 2024

(30) Foreign Application Priority Data

Jun. 21, 2021 (IT) .................. 102021000016223

(51) Int. Cl.
*A63B 21/072* (2006.01)
*A63B 21/00* (2006.01)
(Continued)

(52) U.S. Cl.
CPC ........ *A63B 21/072* (2013.01); *A63B 21/0607* (2013.01); *A63B 21/4035* (2015.10);
(Continued)

(58) Field of Classification Search
CPC ............ A63B 21/0602; A63B 21/0603; A63B 21/0607; A63B 21/072; A63B 21/4035;
(Continued)

(56) References Cited

U.S. PATENT DOCUMENTS 5,058,885 A * 10/1991 Brant .................. A63B 23/12
    482/50
8,911,334 B1 * 12/2014 Cotter ................ A63B 21/4005
    482/111
(Continued)

FOREIGN PATENT DOCUMENTS

| CN | 205 730 107 U | 11/2016 |
| CN | 110 368 639 A | 10/2019 |
| WO | 2016/165200 A1 | 10/2016 |

OTHER PUBLICATIONS

International Search Report (ISR), International Application No. PCT/EP/2022/066683, mailed Oct. 4, 2022, 4 pages.
(Continued)

*Primary Examiner* — Joshua Lee
(74) *Attorney, Agent, or Firm* — Francis J. Maguire; WARE FRESSOLA MAGUIRE & BARBER LLP (57) ABSTRACT

A weight device with handle comprises a body (3) of approximately spheroidal and hollow shape containing a ballast (5) and comprises a handle (7) having an approximately "C" shape and with ends (9) incorporated in the wall (11) of the body (3) or in respective protrusions (13) of said wall (11). The wall (11) of the body (3) comprises an outer layer (15) and an inner layer (17) which are mutually adherent and extending in almost every portion of the body (3). The outer layer (15) is made of soft and/or shockproof material of the closed-cell or open-cell foam type or of the elastomeric type with impact energy absorption. The inner layer (17) is made of rigid or semi-rigid material and of a type that ensures the stability of the shape of the body (3) over time, of cross-linked thermoplastic resin or other stable material with a high elastic modulus.

12 Claims, 5 Drawing Sheets

(51) Int. Cl.
  *A63B 21/06* (2006.01)
  *B29C 41/04* (2006.01)
  *B29C 41/20* (2006.01)
  *B29C 41/22* (2006.01)
  *A63B 71/00* (2006.01)
  *B29K 105/04* (2006.01)
  *B29L 31/52* (2006.01)

(52) U.S. Cl.
  CPC ............ *B29C 41/042* (2013.01); *B29C 41/20* (2013.01); *B29C 41/22* (2013.01); *A63B 2071/0063* (2013.01); *A63B 2220/833* (2013.01); *B29K 2105/045* (2013.01); *B29K 2105/046* (2013.01); *B29L 2031/52* (2013.01)

(58) Field of Classification Search
  CPC ...... A63B 2071/0063; A63B 2071/009; A63B 2209/00; A63B 2220/12; A63B 2220/34; A63B 2220/40; A63B 2220/802; A63B 2220/833; A63B 2225/50; B29C 41/042; B29C 41/20; B29C 41/22; B29K 2105/045; B29K 2105/046; B29L 2031/52
  See application file for complete search history.

(56) References Cited

U.S. PATENT DOCUMENTS

| | | | |
|---|---|---|---|
| 9,526,671 B2 | 12/2016 | Weck et al. | |
| 9,597,567 B1 | 3/2017 | Tran | |
| 9,623,274 B2* | 4/2017 | Holt, IV | A63B 21/075 |
| 9,694,230 B2* | 7/2017 | Cooper | A63B 21/072 |
| 10,543,388 B2* | 1/2020 | Rachele | A63B 21/4029 |
| 11,446,537 B2* | 9/2022 | D'Alesio | A63B 21/4035 |
| 11,944,862 B2* | 4/2024 | Booker | A63B 21/4033 |
| 2009/0093348 A1* | 4/2009 | Wang | A63B 21/0603 482/93 |
| 2012/0149536 A1* | 6/2012 | Trimble | A63B 21/00065 53/469 |
| 2013/0157815 A1 | 6/2013 | Reynolds et al. | |
| 2015/0182777 A1* | 7/2015 | Rarity, IV | A63B 21/0602 482/93 |
| 2021/0060389 A1* | 3/2021 | Wang | A63B 65/06 |

OTHER PUBLICATIONS

Written Opinion of the International Searching Authority (ISA), International Application No. PCT/EP/2022/066683, mailed Oct. 4, 2022, 6 pages.
PCT Demand for International Preliminary Examination (Chapter II), Apr. 4, 2023, 16 pages.
Written Opinion of the International Preliminary Examining Authority (IPEA), International Application No. PCT/EP/2022/066683, mailed Apr. 28, 2023, 6 pages.
Article 34 Amendment filed under Rule 66 PCT Jun. 16, 2023, International Application No. PCT/EP/2022/066683, 13 pages.
International Preliminary Report on Patentability (IPRP), International Application No. PCT/EP/2022/066683, mailed Jun. 21, 2021 6 pages.
Bibliographic Data including English Abstract for Publication No. CN110368639A, DEPATISnet, 4 pages.
Bibliographic Data including English Abstract for Publication No. CN205730107U, DEPATISnet, 3 pages.

* cited by examiner

WEIGHT DEVICE WITH HANDLE AND MANUFACTURING METHOD THEREOF

TECHNICAL FIELD

The present invention falls within the sector concerning gymnastic exercises for training, sport, rehabilitation and for improvement and refers to a weight device with handle for moderate to violent gymnastic exercises or for exercises that require moderate physical effort up to exercises which require the user to apply maximum physical effort to the device, also giving to the latter high handling and/or throwing speeds.

BACKGROUND ART

Weights with an approximately spherical shape and equipped with a handle assigned to be grasped by a user to perform gymnastic or rehabilitative exercises are known.

Generally, these weights are made by casting in earth, of thick metal of the ferrous type. These known metal weights, while being cheap and durable, have the disadvantage of being dangerous for a user thereof, for bystanders and for objects nearby, furthermore their weight and their ergonomic characteristics depend only on the matrix for the earth mold and any variation of the characteristics requires the creation of a new matrix.

Weights consisting of a hollow spheroidal body are also known, generally made of synthetic material and ballasted with a cement conglomerate poured into it, to which a handle is glued. This type of weights has the disadvantage of not being free from the risk of detachment of the handle, in particular after many cycles of use, with consequent possible injuries to the user and to bystanders and damage to objects.

Furthermore, both said known types of weights with handle have the disadvantages of being very noisy whenever they are deposited on the floor or on an object and of damaging any object or thing against which they were thrown, for example if they were thrown against a normal cement wall or in bricks, at each impact they would damage the wall and/or themselves.

Document WO2016165200A1 discloses a soft kettle-shaped dumbbell comprising a metal handle, retaining sheets, a surface layer and a fiber layer, wherein the sealing sheets for stopping movement are connected on two top ends of the metal handle; the surface layer covers the retaining sheets and the fiber layer; a weight-balancing layer is contained inside the fiber layer, and a slide fastener is provided on the surface of the surface layer.

Document CN110368639A discloses a safe dumbbell comprising a dumbbell rod for holding, spherical dumbbell heads arranged at the two ends of the dumbbell rod, the dumbbell rod comprising an outer wrapping layer and filling particles for balance weight arranged in the outer wrapping layer, which is made of soft rubber materials. The dumbbell head comprises inner and outer sleeves whose intermediate space is filled with foamed polystyrene particles.

DISCLOSURE OF THE INVENTION

An object of the present invention is to propose a weight device with handle for moderate to violent gymnastic exercises, i.e. capable of satisfying the needs of users who intend to do exercises with moderate efforts, for example for rehabilitation or warm-up, or with medium or violent efforts which, for example, involve throwing the device as far as possible or against a wall.

Another object is to propose a device which in addition to being very resistant is also silent when it hits floors, walls or objects in order to be used also in condominiums, clinics, rehabilitation centers, etc.

A further object is to produce a device whose shape is unalterable over time even if subjected to intense or violent stresses.

Another object is to propose a device whose weight can be modified.

A further object is to produce a device which is almost free from rebounds even when thrown against walls or floors.

Another object is to propose a device that can also be used in environments with almost any type of flooring, for example: wood parquet, marble, ceramic, carpet, linoleum or other organic materials, varnished anti-slip materials and the like.

A further object is to produce a device having a fixed and stable center of mass in order not to unbalance the users during the exercises.

Another object is to propose a device which is safe for the user and bystanders.

Another object is to produce a device that can be used both indoors and outdoors.

Another object is to propose a device that can be used free or tied to a suspension cable in athletic training, in particular in shot put and discus throw, in boxing or martial arts and/or in replacement of the so-called Slammer and Wall Ball tools.

A further object is to produce a device capable of detecting and transmitting and/or storing dynamic parameters relating to its use, such as accelerations, linear and rotational speeds, spaces traveled, energy applied to it, etc.

BRIEF DESCRIPTION OF DRAWINGS

The characteristics of the invention are highlighted below with particular reference to the accompanying drawings in which.

BEST MODE TO CARRY OUT THE INVENTION

With reference to FIGS. 1 to 20, numeral 1 indicates the weight device with handle object of the present invention. The device 1 comprises a body 3, having an approximately spheroidal and hollow shape containing a ballast 5, and comprises a grasping handle 7 having an approximately "C" shape and with ends 9 incorporated in the wall 11 of the body 3 or in respective protrusions 13 of this wall 11. Alternatively, the body 3 can be shaped as a bell or kettle, that is, it can be approximately spheroidal with a flat bottom opposite to the handle 7.

Figure 1:
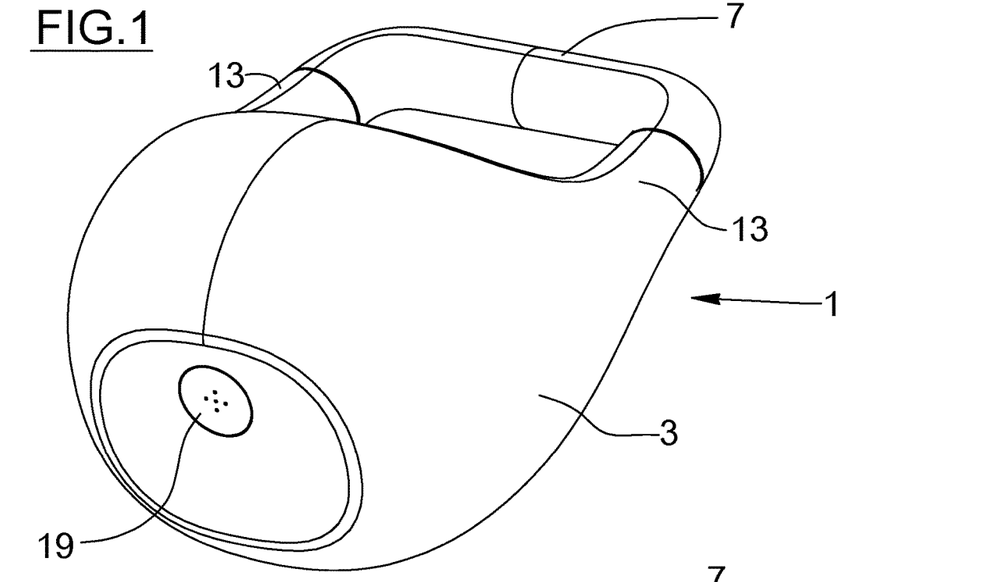
FIG. 1 shows an axonometric and schematic view of the weight device with handle object of the present invention.
Figure 2:
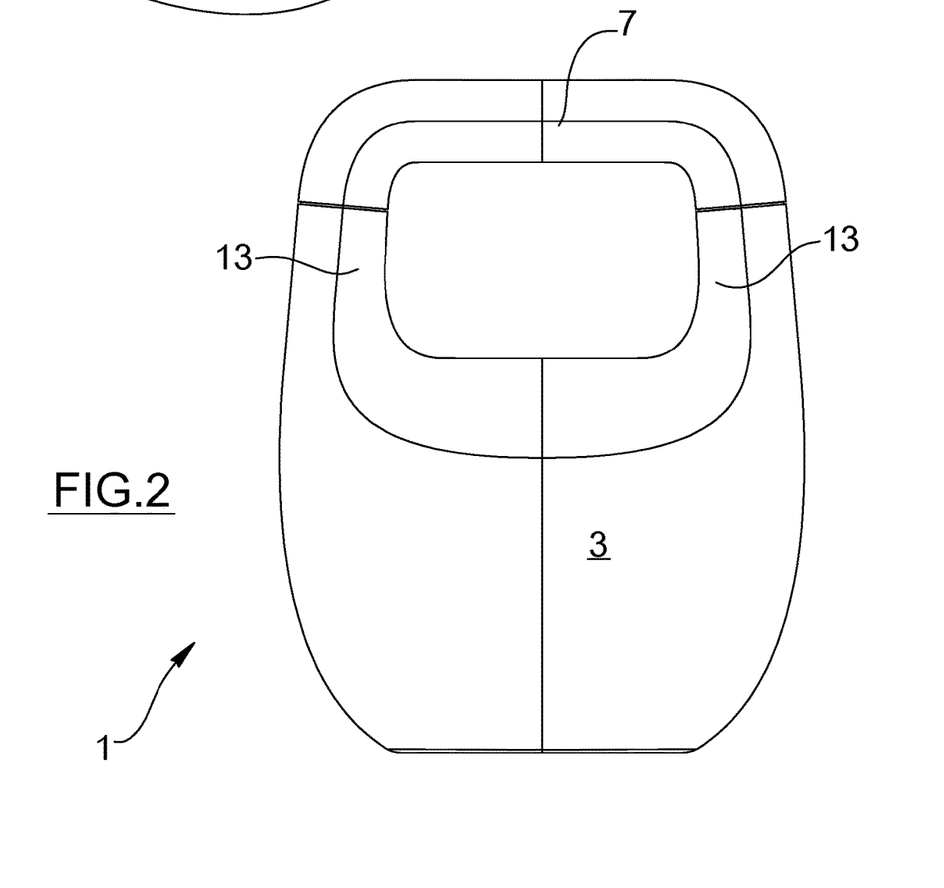
FIG. 2 shows a front view of the device of FIG. 1.
Figure 3:
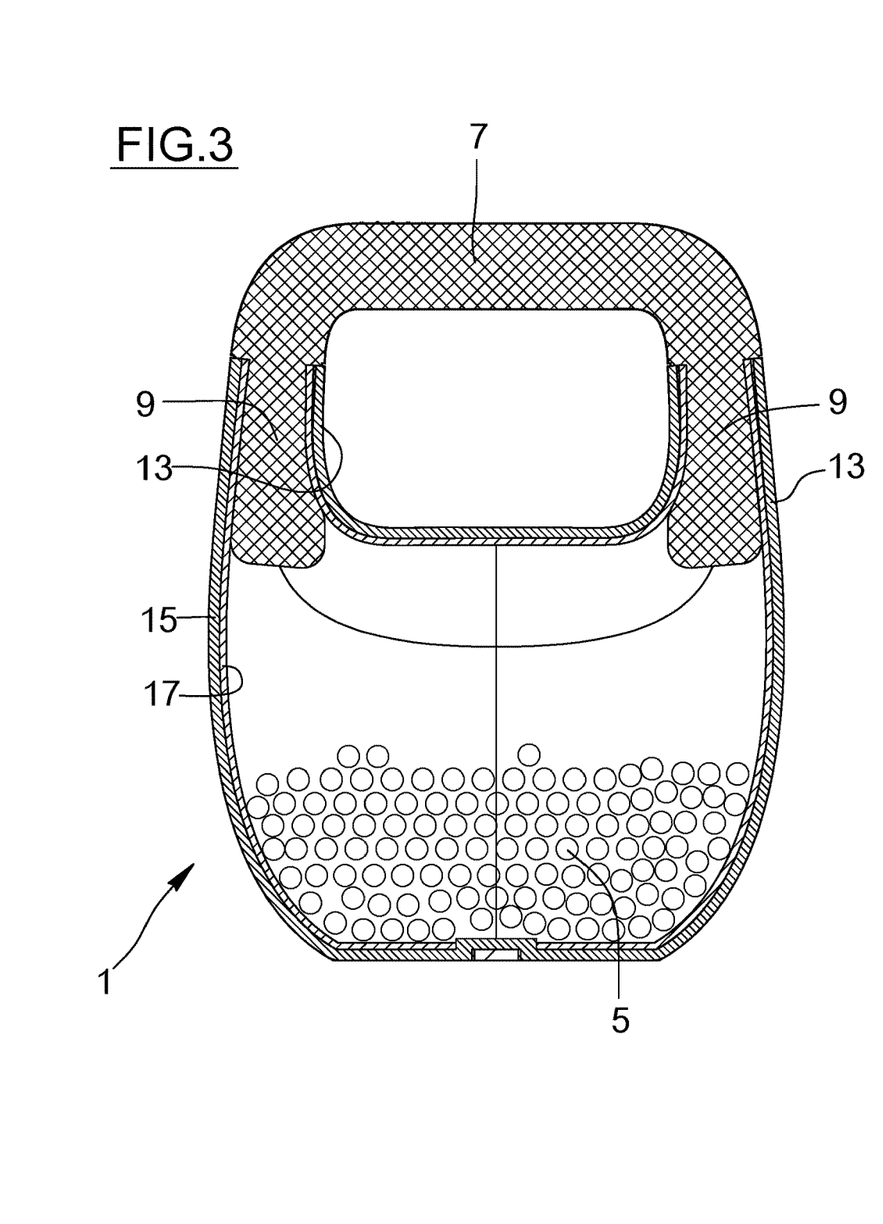
FIG. 3 shows a sectional view along a frontal plane of the device of FIG. 2.
Figure 4:
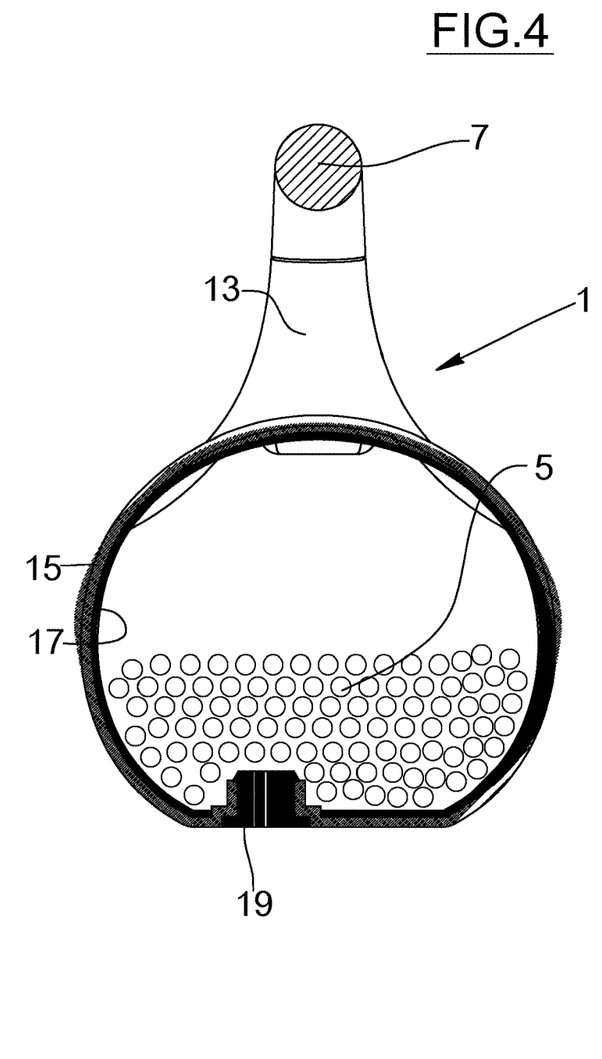
FIG. 4 shows a sectional view along a sagittal plane of the device of FIG. 2.

The wall 11 of the body 3 comprises an outer layer 15 and an inner layer 17 mutually adhering and extending in practically every portion of the body 3.

The outer layer 15 is of a soft and/or shockproof material and the inner layer 17 is of a rigid or semi-rigid material and of a type which ensures the stability of the shape of the body 3 over time.

More specifically, the material of the outer layer 15 is of the closed-cell or open-cell foam type or is of the elastomeric type with impact energy absorption. For example, the material of which said outer layer 15 is made comprises an elastomer based on polyurethane or polyisobutylene, foam polyethylene, foam polyurethane, foam EPDM, and/or the like.

The inner layer 17 consists of a cross-linked thermoplastic resin or other stable material, i.e. non-deformable over time, and having a high elastic modulus, for example based on polyamide, nylon, and/or the like.

The average thickness of the outer layer 15 is between one and ten times the average thickness of the inner layer 17, preferably the outer layer 15 is two or three times thicker than the inner 17 one.

The ballast 5 occupies a portion of the internal volume of the body 3, or it completely fills this volume.

The ballast 5 comprises solid elements, which are preferably elastically deformable to dissipate the energy of the impacts of the device 1 against rigid walls and make such impacts less violent.

These solid elements may consist of fragments or shavings of rubbery or elastomeric material, of processing scraps of elastomers or similar materials, of spheres or spheroidal pieces of elastic material, or pieces, blocks and/or pellets of semi-rigid material, with elastic modulus equal to or different from, for example lower than, that of the inner layer 17. Between said solid elements there are interstices and/or intercommunicating cracks.

The solid elements of the ballast 5 can be left free inside the body 3, or they can be constrained inside the internal volume thereof. For example, whether the ballast 5 occupies the entire body 3 or occupies only a part of it, the solid elements can be blocked together and/or to the inner layer 17 by means of suitable materials such as glues, silicones, cements or the like, which penetrate through the interstices of the ballast 5 binding to this and to the body 3.

The solid elements of the ballast 5 can also comprise sandy or powdered materials, or the solid ballast 5 can consist of a single block, for example of rubbery material, which fills the body 3 partially or entirely.

Alternatively or in addition to the solid elements, the ballast 5 can comprise materials in fluidic form, such as water, other transparent or colored liquids, air, gaseous elements or compounds or mixtures thereof, and so on.

The weight of the device 1 can be determined by the specific weight and the amount of ballast 5 it contains.

The device 1 comprises a damping element 19, preferably consisting of a diaphragm applied to an opening 21 of the body 3 and provided with holes which put the internal volume of the body 3 in flow communication with the outside of the body 3 and vice versa.

The opening 21 is obtained through the thickness of the body 3, that is, through the outer 15 and inner 17 layers.

Alternatively, for use in swimming pools and more in general in water, the damping element 19 can be without the opening 21, consisting of a diaphragm made in a single body with the body 3, or occlusion means of said opening 21 can be provided.

When, for example following a violent impact of the device 1 against a floor or a wall, the body 3 is deformed reducing its internal volume, the internal gas is compressed but exits through the small holes of the damping element 19 contributing to dampen the rebound and to soften and muffle the impact and the noise originated therefrom.

The handle 7 is preferably made of one of the materials of the inner 17 or outer 15 layers, or of a material having intermediate characteristics between those of the said materials of the inner 17 or outer 15 layers. For example, the handle 7 could be made of a material similar to that of the outer layer 15 with the same stiffness or a little more rigid. Alternatively, the handle 7 can be made of an elastomer, possibly of the high-strength type.

Optionally, the device 1 can comprise at least one sensing element among accelerometer, gyroscope, GPS or differential GPS receiver or a local position detector. The device 1 can also comprise at least one management element among Wi-Fi, Bluetooth or RFID-type device, memory, electric accumulator and/or induction power supply.

Each sensing or management element can be housed and fixed in a respective seat obtained in the handle 7 and/or in the damping element 19 and/or in the ballast 5, or at least one of them is fixed inside the body 3 to the inner layer 17.

For example, the device 1 can be equipped with sensors and apparatus of the type used in mobile phones, such as three orthogonal accelerometers or a three-axis accelerometer, a three-axis gyroscope, and possibly a GPS receiver of the differential type or another local positioning tool. Said sensors and apparatus can generate and supply the respective data to the management element, which includes a Wi-Fi or Bluetooth or RFID-type transmitter and which transfers such data to a smartphone or mobile phone or to a receiver or illuminator, compatible thereto, of a computerized system programmed for using the data.

The smartphone and/or the system can be equipped with programs for viewing the data received from the management element, relating for example to the speed of movements and throws, accelerations, displacements and trajectories, and to the throw distance of the impacts of the device 1.

The smartphone and/or the system can also use the received data and process them to obtain information on the exercises performed, for example the calories consumed and/or the number and type of exercises performed.

The sensing and management elements can also be used so that a user of the device 1, at the beginning of the gymnastic or training session, connects their smartphone with the device 1 itself via the management elements, for example of Bluetooth type, records on the smartphone the data relating to the training session collected by the sensing elements and transmitted to the smartphone by the management elements, then disconnects their smartphone from the device 1 at the end of the session; in this way each user can keep track of the gymnastic exercises performed by using the device 1.

Figures 15, 18:
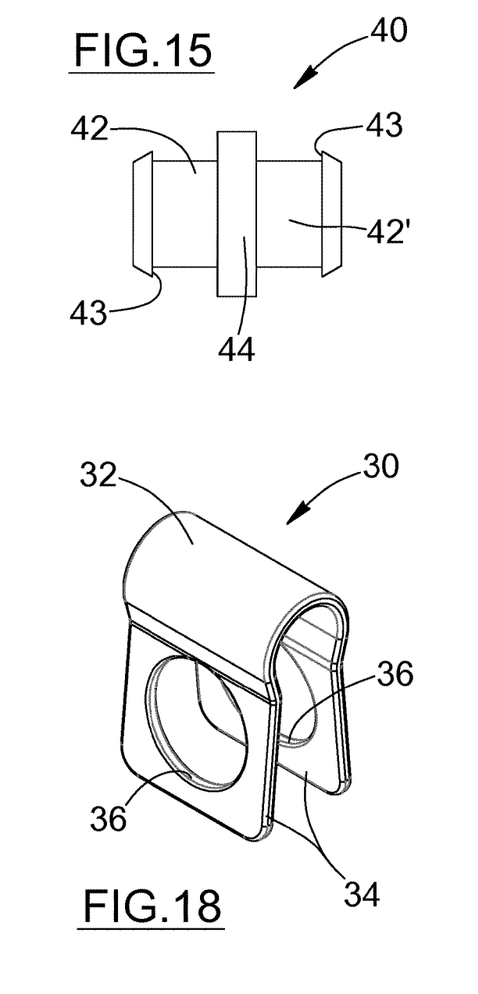
FIGS. 15 and 16 show lateral and axonometric views respectively of a connection element of the device of FIG. 1.
FIG. 18 shows an axonometric view of a fork element of the device of FIG. 1.
Figure 16:
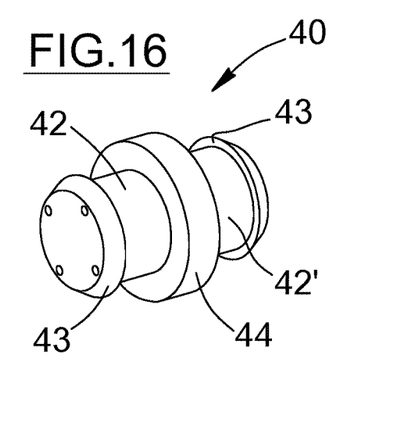

Optionally, the device 1 further comprises a connection element 40, of resistant material such as metal or a rigid polymer, having a middle portion 44 of an almost cylindrical shape, or of a prismatic shape with a polygonal base. The middle portion 44 supports a first portion 42 on one side and supports a second portion 42' on the opposite side. These first portion 42 and second portion 42', for example cylindrical or at least of elongated shape, develop specularly from the median portion 44, and the free extremity of each one ends in a respective matching edge 43.

Figure 17:
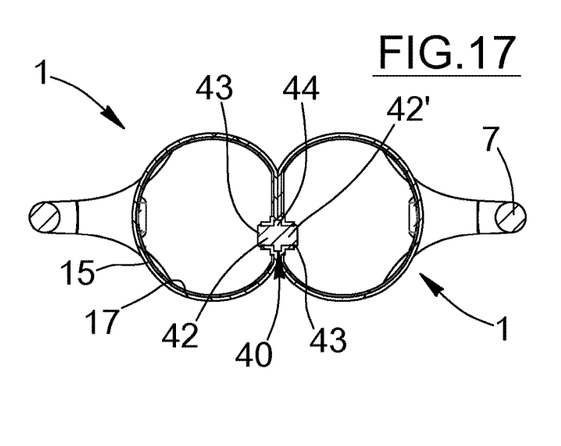
FIG. 17 shows a sectional view of two devices of FIG. 1 mutually locked by means of the connection element of FIG. 15.

The first portion 42 is for coupling with the device 1, being inserted and joint blocked, by means of the matching edge 43, into a corresponding concave seat complementary thereto and made in the body 3 of the device 1 itself.

The second portion 42' is assigned to be inserted and blocked, by means of its own matching edge 43, into a corresponding concave seat complementary thereto and obtained in the body 3 of an additional device 1 for hooking it, coupling and locking two devices 1 to one another.

Each of these seats can coincide, for example, with the opening 21 obtained in the bottom of the body 3 of its respective device 1, and can have shape complementary to the respective first 42 or second 42' coupling portion and to approximately a half of the middle portion 44, so that the connection element 40 can be completely housed and locked in the concave seats of the two coupled devices 1, with the bottom of one device 1 in contact with the bottom of the other device 1.

Optionally, the outer layer 15 and the inner layer 17 are made of a material completely or partially transparent to the visible wavelengths, and the device 1 further comprises an interactive electronic element hosted inside the body 3, let free inside the internal volume thereof or fixed through its thickness or to the inner layer 17.

Said interactive electronic element comprises at least replaceable or rechargeable battery power elements, wireless connection elements of the Wi-Fi or Bluetooth type, a pressure and/or acceleration sensor, and lighting elements of the LED type of a predetermined or multicolor RGB tone. Said components are for example assembled on a printed circuit, which is fixed directly inside the body 3 or to a cap or other occlusion element blocked, possibly hermetically, within an opening 21 of the body 3.

The interactive electronic element is assigned to be connected, via the wireless connection elements, to a smartphone or other remote control which gives the interactive electronic element commands to turn the lighting elements on and off and to adjust their color, so that the user practices in reaching the device 1 in the shortest possible time, for example after the luminous elements have switched on. Once the user has grasped the device 1, the pressure or acceleration sensor detects the grasp by the user, communicating the event to the remote control, which can react, for example, by commanding the lighting elements to switch off.

Several interactive electronic elements can optionally be comprised in the same device 1, fixed for example in different positions or different openings 21 of the body 3 and each connected to the same or to a different smartphone or remote control.

Figure 19:
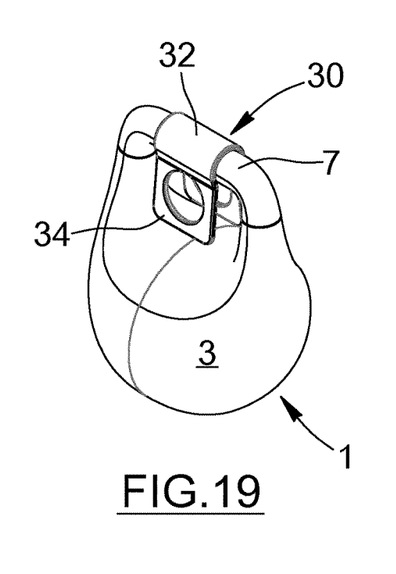
FIG. 19 shows an axonometric view of the device of FIG. 1 with the fork element of FIG. 18.

Optionally, the device 1 further comprises a fork element 30 provided with a holding portion 32 of a shape complementary to the handle 7, i.e. shaped as a hollow cylindrical sector with the side wall discontinuous and open between two opposite flat arms 34 of the element a fork 30 itself. The two arms 34 protrude and extend almost parallel to each other from the holding portion 32, which is assigned to be constrained and snap-locked to the handle 7 of the device 1, with the arms 34 facing towards the body 3 or in the opposite direction. The thickness and the material, for example plastic, aluminum or steel, of the holding portion 42, therefore, provide the latter with sufficient elasticity so that it can wrap and snap onto the handle 7, while maintaining a rigidity such as to be used as specified below.

The two arms 34 can also slightly diverge from each other moving away from the holding portion 32, conforming a sort of a pilot in the direction of the holding portion 32 to facilitate its attachment to the respective handle 7.

Each arm 34 of the fork element 30 can optionally have a respective opening 36 to connect the device 1, to which the fork element 30 itself is fixed, to a different exercise tool. For example, each arm 34 is provided with a circular opening 36 with a diameter equal to the diameter of a barbell, and two devices 1 are thus fixed to the respective ends of the barbell.

Figure 20:
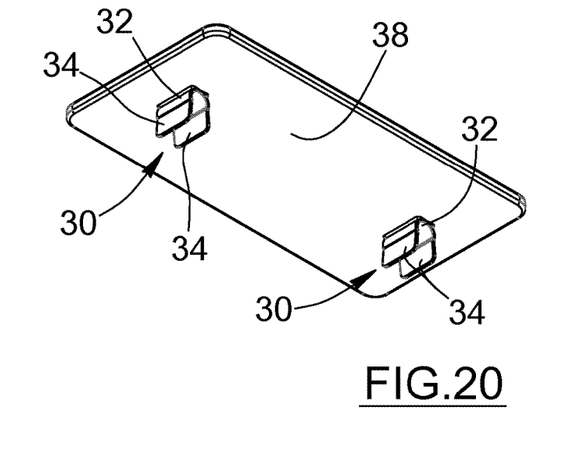
FIG. 20 illustrates an axonometric bottom view of two fork elements fixed to a board of the device of FIG. 1, where some parts have been removed to better highlight others.

Alternatively, the device 1 comprises two fork elements 30 whose holding portions 32 are screwed, glued, welded, wedged or otherwise fixed to the same lower face of a flat and rigid board 38, or platform, with the arms 34 facing in the opposite direction to said face of the board 38, and with each fork element 30 connectable to the handle 7 of a respective device 1. The fork elements 30 are fixed to the board 38 spaced from each other by a predetermined distance, for example of about 50 cm, preferably with the holding portions 32 mutually parallel and aligned along a median line of the board 38 itself. Once two devices 1 are fixed below the board 38, the user can climb onto the board 38 suspended above the two devices 1, on the face of the board 38 opposite to the face to which the fork elements 30 are fixed, to perform proprioceptive exercises and train their balance.

It should be noted that the device 1 can be optimized, for example by determining the weight of the ballast 5, for different types of users and exercises, and is suitable even for violent activity types, such as throws against walls, along floors or towards targets, which are precluded to the kettlebells of a known type.

It should be noted that the device 1, thanks to its versatility, can also be advantageously configured and manufactured with a soft and light-weight handle and body for Home Training for all ages and for Functional Rehabilitation also in the clinical area. Therefore, the scope of application of the device 1 ranges from violent to low-effort exercises and can be advantageously configured for such extreme applications and for all intermediate ones.

The tests and validation experiments of the device 1 of the invention have confirmed the achievement of the aforementioned objectives and in particular have confirmed that the device 1 is extremely silent in all conditions of use, including when thrown against walls and floors, and that this advantageous effect is surprisingly achieved also thanks to the materials used in making the inner 17 and outer 15 layers and to the chosen ratio between the average thickness of these layers. The device 1 is also practically free from rebounds.

Figure 5:
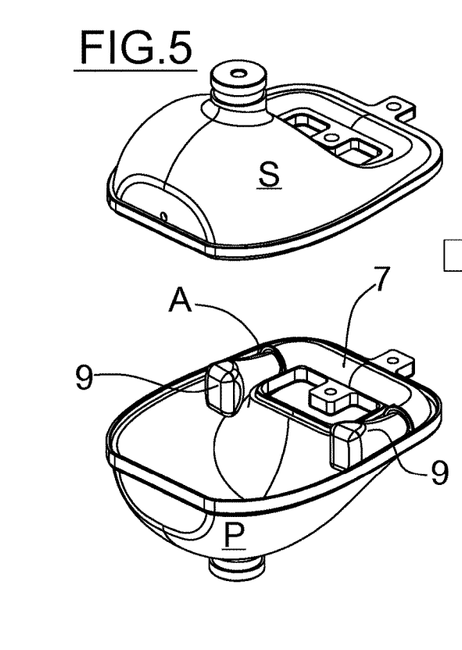
FIGS. 5 to 7 show a filling sequence of a mold for a first manufacturing step of the device of FIG. 1.
Figure 6:
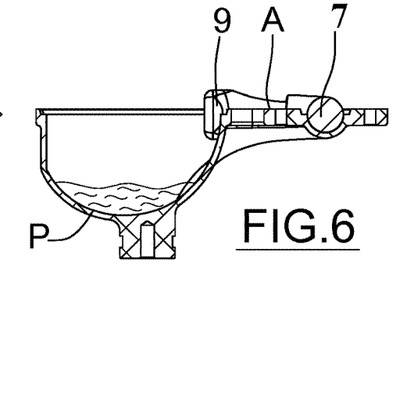
Figure 7:
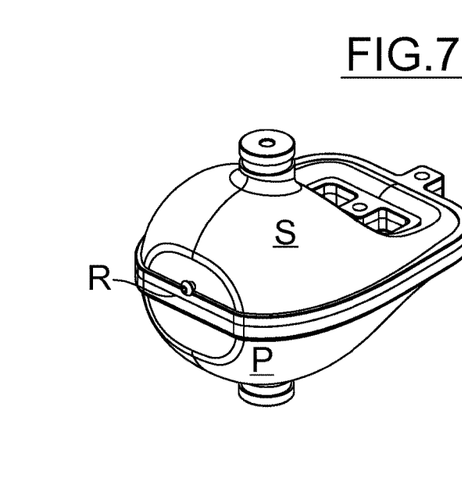
Figure 8:
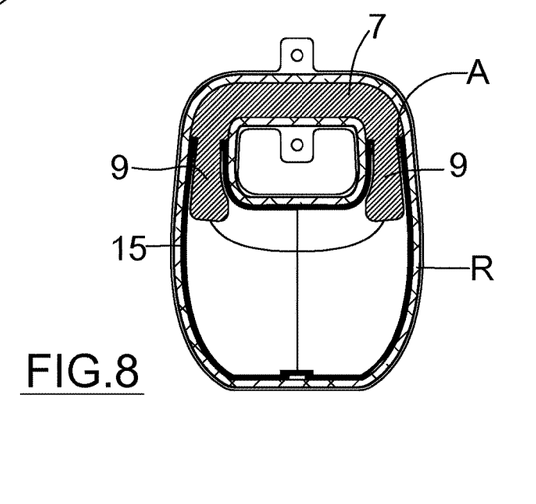
FIGS. 8 and 9 show views sectioned from respective mutually orthogonal planes of the mold of FIG. 7 at the end of said first step.
Figure 9:
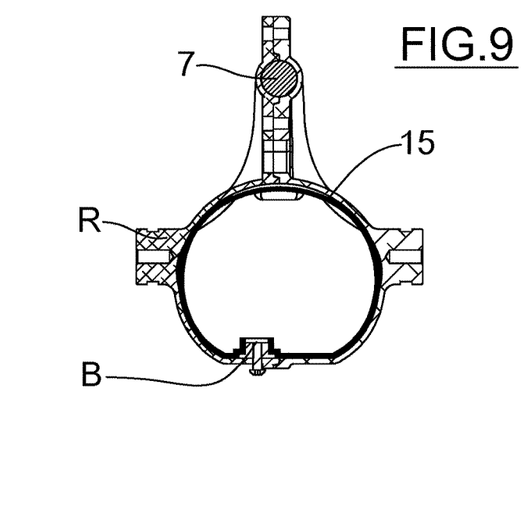
Figure 10:
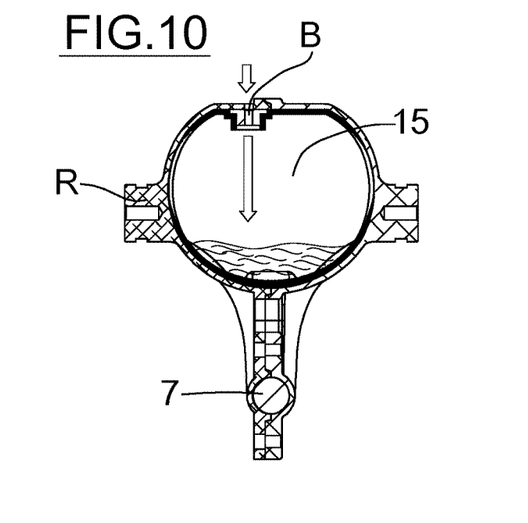
FIGS. 10 to 14 show sectional views of the mold of FIG. 7 in subsequent manufacturing steps of the device of FIG. 1.
Figure 11:
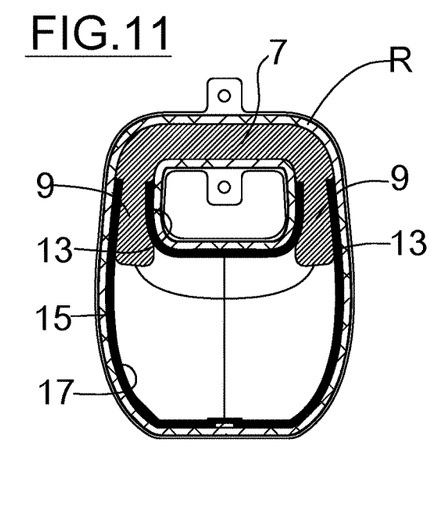
Figure 12:
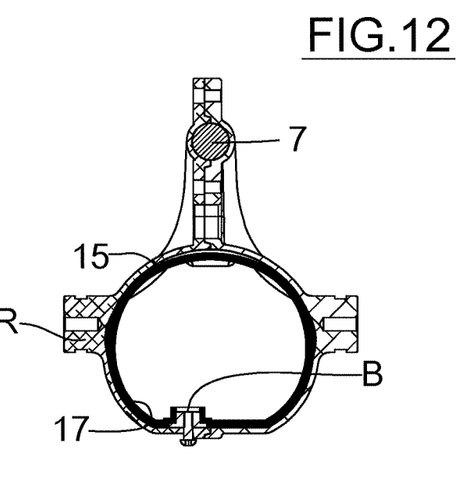
Figure 13:
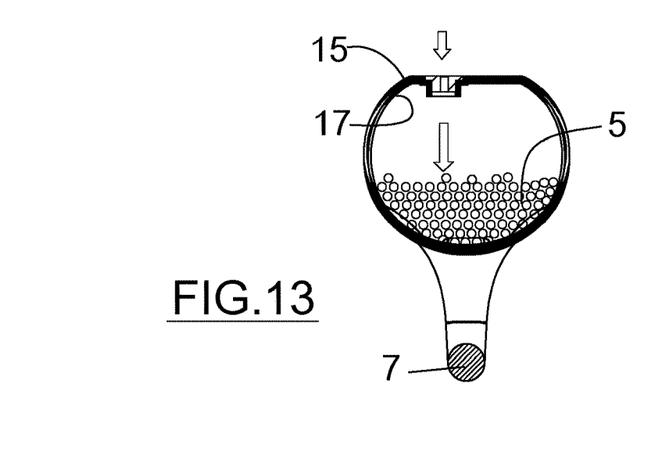
Figure 14:
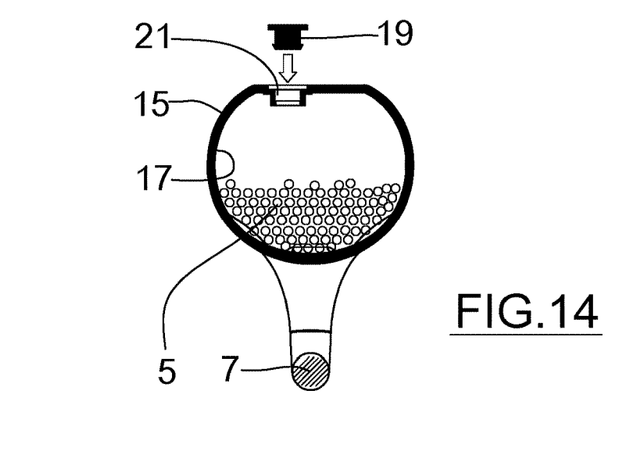

With particular reference to FIGS. 5 to 14, object of the present invention is also a method for manufacturing the device 1 described above comprising the following steps:
  placing the handle 7 in a in a co-forming housing A, i.e. of the type for inserts, of an element P of a mold R for rotoforming having at least two elements P, S, where said housing A is shaped to incorporate only the ends 9 of the handle 7 in the body 3;

pouring at least in the element P of the mold R a predetermined amount of the material for realizing the outer layer 15;

closing the elements P, S forming the mold R and having the latter undergo rotations and heating to complete the rotoforming of the outer layer 15;

pouring a predetermined amount of the material of the inner layer 17 into the mold R, through a feeding inlet B thereof, and have the mold R undergo rotations and heating to complete the rotoforming of the inner layer 17 incorporating the ends 9 of the handle 7 into the wall 11 of the body 3 formed by these layers;

opening the mold R and extracting the body 3 with the handle 7;

inserting, through the inlet B, a predetermined amount of ballast 5 into the volume of the body 3;

closing the opening 21 of the body 3, formed i.e. originated during the rotoforming in correspondence with the inlet B, with the damping element 19 obtaining the device 1.

The invention provides that the steps can be carried out in the sequence indicated above or in a different order, for example the pouring of the material for the realization of the outer layer 15 can be carried out after closing the elements P, S of the mold R, through the inlet B.

Optionally, whenever the solid elements of the ballast 5 need to be fixed mutually and/or to the inner layer 17, the method further provides to insert into the body 3 the materials assigned to constrain the ballast 5 inside the body 3 itself, through the inlet B or the opening 21.

The invention claimed is:

1. A weight device with a handle comprising a body (3) of approximately spheroidal and hollow shape containing a ballast (5) and comprising a handle (7) having an approximately "C" shape and with ends (9) incorporated in a wall (11) of the body (3) or in respective protrusions (13) of said wall (11); the wall (11) of the body (3) comprising an outer layer (15) and an inner layer (17) which are mutually adherent and extending in almost every portion of the body (3), the outer layer (15) being made of soft and/or shock-proof material of a closed-cell or open-cell foam type or of an elastomeric type with impact energy absorption, and the inner layer (17) being made of rigid or semi-rigid material and of a type that ensures stability of a shape of the body (3) over time, of cross-linked thermoplastic resin or other stable material with a high elastic modulus; said device (1) comprising at least one sensing element among accelerometer, gyroscope, GPS or differential GPS receiver or a local position detector, and comprising at least one management element among Wi-Fi, Bluetooth or RFID-type device, memory, electric accumulator and/or induction power supply; wherein said device (1) comprises a damping element (19) applied to the body (3) and provided with holes which put a volume inside the body (3) in flow communication with the outside and vice versa.

2. The device according to claim 1, wherein an average thickness of the outer layer (15) is comprised between one and ten times an average thickness of the inner layer (17).

3. The device according to claim 1, wherein the ballast (5) partially or entirely occupies an interior of the body (3) and comprises solid elements, preferably elastically deformable, and/or materials in fluidic form.

4. The device according to claim 3, wherein the at least one sensing element and the at least one management element are housed in the handle (7) and/or in the damping element (19) and/or in the ballast (5), or at least one of the at least one sensing element and the at least one management element is fixed inside the body (3).

5. The device according to claim 1, wherein the handle (7) is made of one of the materials of the inner (17) or outer (15) layers, or of a material having intermediate characteristics between those of said materials of the inner (17) or outer (15) layers, or of a high-resistance elastomeric material.

6. The device according to claim 1, further comprising a connection element (40) having a middle portion (44) supporting a first portion (42) on one side, for coupling to the device (1) in a complementary seat made in the body (3) of the device (1), and a second portion (42') on the other side assigned for coupling into a complementary seat made in the body (3) of an additional device (1), to lock two devices (1) to one another.

7. The device according to claim 1, wherein the outer layer (15) and the inner layer (17) are made of semitransparent or transparent material, and wherein the device comprises at least one interactive electronic element inside the body (3) comprising at least power elements, wireless connection elements, a pressure and/or acceleration sensor and lighting elements.

8. The device according to claim 1, further comprising a fork element (30) having a holding portion (32), complementary in shape to the handle (7) and open between two opposite flat arms (34) of the fork element (30) protruding almost mutually parallel from the holding portion (32), which is assigned to be snapped to the handle (7).

9. The device according to claim 8, wherein each arm (34) of the fork element (30) has a respective opening (36) for connecting the device (1) to a different gymnastic device.

10. The device according to claim 9, comprising two fork elements (30) with holding portions (32) that are fixed to a same face of a board (38), with the arms (34) facing in the opposite direction to said face of the board (38), and with each fork element (30) connectable to the handle (7) of a respective device (1).

11. A method for manufacturing the device of claim 1, comprising:

placing the handle (7) in a co-forming housing (A) of an element (P) of a rotoforming mold (R) having at least two elements (P, S);

pouring at least in the element (P) of the mold (R) a predetermined amount of the material for realizing the outer layer (15);

closing the elements (P, S) to form the mold (R) and having the latter undergo rotations and heating to complete the rotoforming of the outer layer (15);

pouring into the mold (R), through a feeding inlet (B) thereof, a predetermined amount of the material of the inner layer (17) and have the mold (R) undergo rotations and heating to complete the rotoforming of the inner layer (17) incorporating the ends (9) of the handle (7) into the wall (11) of the body (3) formed by these layers;

opening the mold (R) and extracting the body (3) with the handle (7);

inserting, through the inlet (B), a predetermined amount of ballast (5) into the volume of the body (3); and closing the opening (21), formed in correspondence with the inlet (B), of the body (3) with the damping element (19).

12. The method according to claim 11, further comprising inserting materials assigned to constrain the ballast (5) inside the body (3).

* * * * *